United States Patent [19]

Fritsch

[11] Patent Number: 5,051,106
[45] Date of Patent: Sep. 24, 1991

[54] TRANSVERSE AXIS INFINITELY VARIABLE TRANSMISSION

[76] Inventor: Joseph E. Fritsch, 14001 Sherwood, Oak Park, Mich. 48237

[21] Appl. No.: 548,244

[22] Filed: Jul. 5, 1990

[51] Int. Cl.⁵ .......................................... F16H 15/50
[52] U.S. Cl. ................................. 475/192; 475/183; 475/185; 475/191
[58] Field of Search ............... 475/183, 185, 191, 192, 475/193, 197

[56] References Cited

U.S. PATENT DOCUMENTS

| | | | |
|---|---|---|---|
| 1,698,229 | 1/1929 | Hayes | 74/796 |
| 2,020,677 | 11/1935 | Erban | 74/200 |
| 2,745,298 | 5/1956 | Braunagel et al. | 74/798 |
| 2,850,911 | 9/1958 | Kraus | 74/200 |
| 2,886,986 | 5/1959 | Kopp | 74/796 |
| 3,099,927 | 8/1963 | Anderson | 74/796 |
| 3,287,994 | 11/1966 | Kotik | 475/191 |
| 3,410,156 | 11/1968 | Davis | 74/721 |
| 3,837,233 | 9/1974 | French | 74/200 |
| 4,232,561 | 11/1980 | Kashihara et al. | 74/191 |
| 4,266,446 | 5/1981 | Fritsch | 74/796 |
| 4,369,667 | 1/1983 | Kemper | 74/191 |
| 4,435,997 | 3/1984 | Van Doorne | 74/796 |
| 4,524,642 | 6/1985 | Fritsch | 74/796 |
| 4,968,290 | 11/1990 | Kashihara et al. | 475/193 |

FOREIGN PATENT DOCUMENTS

| | | | |
|---|---|---|---|
| 63-140157 | 6/1988 | Japan | 475/193 |
| 34786 | 7/1925 | United Kingdom | 475/192 |
| 908558 | 10/1962 | United Kingdom | 475/191 |

Primary Examiner—Allan D. Herrmann
Assistant Examiner—Ryan W. Massey

[57] ABSTRACT

A transverse axis infinitely variable transmission of the traction type which uses a planetary reduction principle whereby the highest input/output speed ratio is achieved as the contact radii of the elements approach similarity. All the traction elements of the present invention operate at virtually the same high surface speed whereby the minimum relative tangential force, transmitted through the traction contacts, will generate the maximum torque through the transmission. The present invention includes a spider which rotates with the main shaft about the first axis of the transmission. Compound-plants are rotatably supported by spindles which radiate outwardly from the spider hub. The axis of rotation of the compound-planets is transverse to the first axis, thereby insuring that the maximum number of traction elements of the same approximate size are incorporated into the smallest possible envelope. A first surface of each of the compound-planets is engaged with a non-rotating reaction member. A second surface of each of the compound planets is engaged with a rotor. The unique geometry of the traction elements results in a traction contact shape which is a long, narrow oval, with the major axis in the rolling direction. This geometry greatly increases the coefficient of traction, since traction is directly related to the buildup of lubricant strain in the rolling direction. Additionally, this traction contact shape virtually eliminates spin related fluid shear, thereby greatly increasing efficiency. The present invention has a very short power path consisting of only two traction contacts.

31 Claims, 7 Drawing Sheets

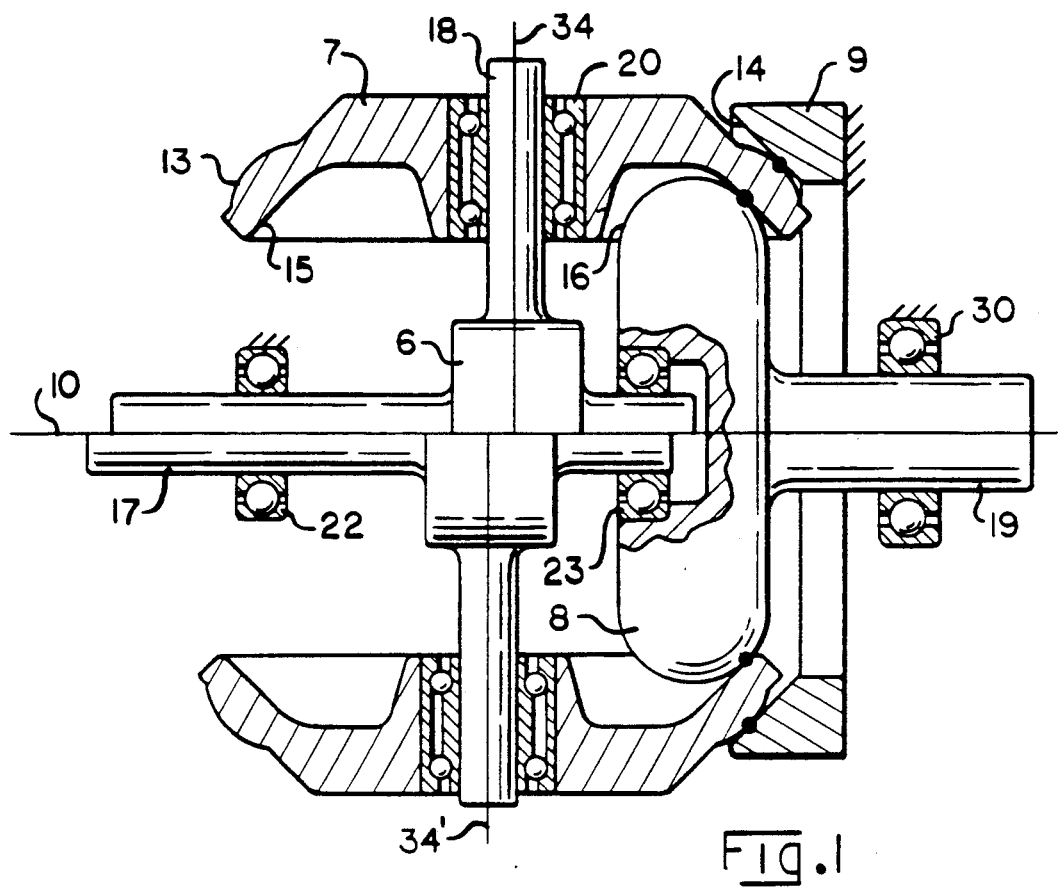
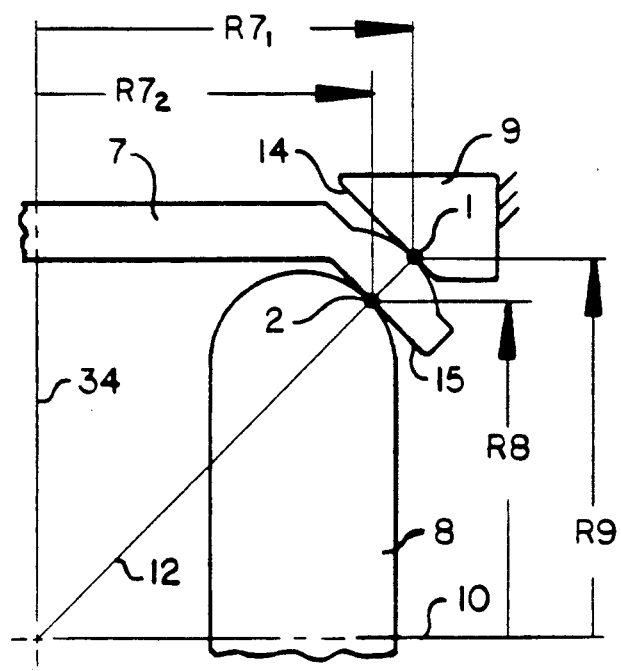
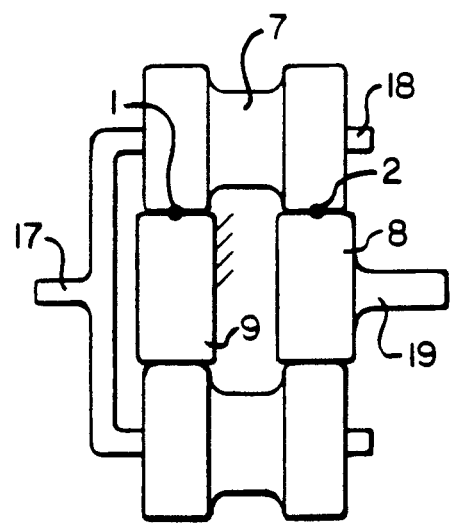
Fig.1
Fig.2
Fig.3

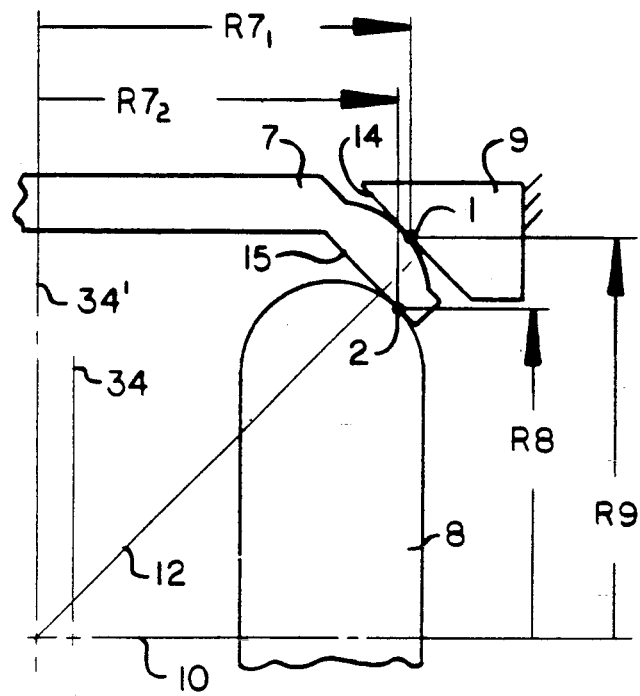
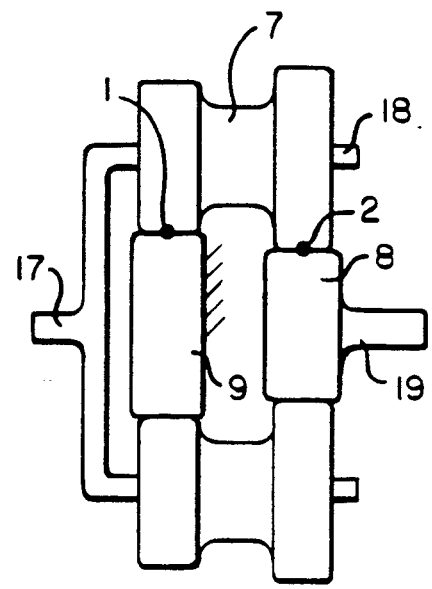
Fig.4  Fig.5
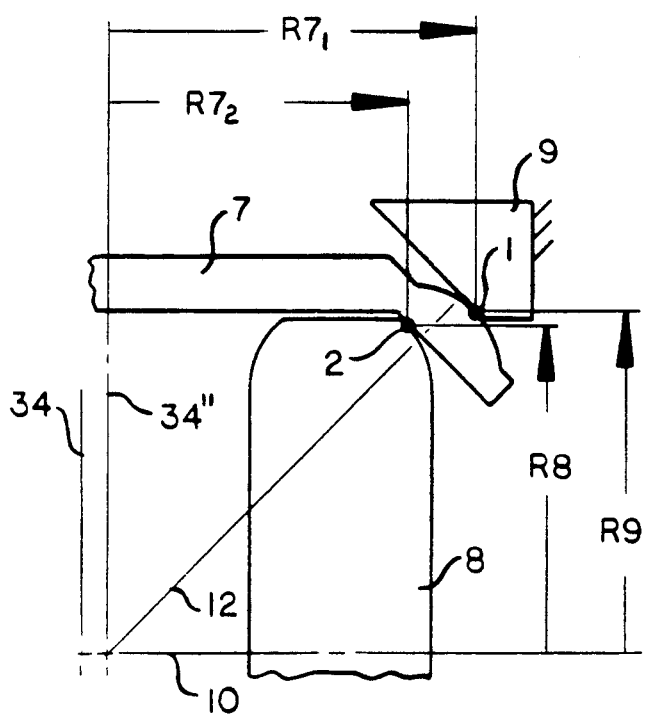
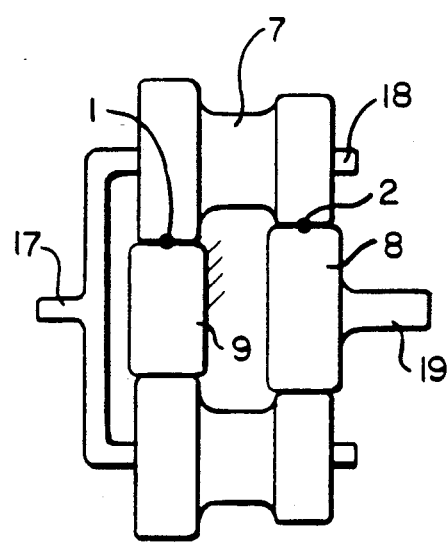
Fig.6  Fig.7

TRANSVERSE AXIS INFINITELY VARIABLE TRANSMISSION

TECHNICAL FIELD

The present invention relates generally to infinitely variable traction drive transmissions, and more particularly, to a traction drive transmission of the transverse axis planetary type, having a very high power to weight ratio, and the capability of achieving high input/output reduction ratios.

BACKGROUND OF THE INVENTION

Variable speed ratio traction drives are well known and have been used for years in applications where efficiency and the power to weight ratio was not of primary concern. Up to the present time, due to their multiple power paths, the most successful of the commercially available traction drives have been of the planetary type. However, even these are high weight, low power units. The inherent advantages of using rollers rather than gears to transmit power, such as smooth, vibration free power transfer, is offset by the limited capability of traction drives to transmit any appreciable tangential force through the traction engagement area. This is due to the very low coefficient of traction of even specially formulated traction lubricants. In addition to the very low coefficient of traction, rotational shearing of the lubricant within the traction engagement area is considered by those knowledgeable in the field, to be the single largest deterrent to high performance in traction drives. The heat generated by this shearing action can be substantial. U.S. Pat. No. 2,020,677, U.S. Pat. No. 3,099,927 and U.S. Pat. No. 4,369,667 demonstrate the persistence of this problem. The geometry of all existing traction drives allows very little flexibility in the size or shape of its traction engagement area. The elastic deflection of the mating traction elements define the geometry of the engagement area. The length of the engagement area, in the rolling direction, is predetermined by the rolling radius of the mating elements. Thus, the majority of traction drives in use today, have engagement area ellipses in which the width of the engagement area (transverse to the rolling direction) is up to four times the length. It is the width of the engagement area which causes spin related oil shear and the great loss of efficiency. The fact that many conventional traction drives use excessive load, normal to the engagement area, is further evidence of the efforts being made to increase the capacity of these traction drives without further increasing the width of the engagement area and thus, lubricant shear.

While some of these disadvantages are overcome in U.S. Pat. No. 4,524,642, it should be observed that the present invention has fewer rotating elements and a shorter power path consisting of only two engagement areas.

DISCLOSURE OF THE INVENTION

It is an object of the present invention to provide a infinitely variable traction drive transmission which is capable of transmitting high torque at very high efficiency.

It is also an object of the present invention to provide a transmission which employs surfaces for conveying rotational energy, such as traction surfaces, rather than gears to transmit power It is therefore an object of the present invention to provide a transmission which does not depend on large differences in radii of the mating elements to obtain the required speed ratio. Rather, the present invention incorporates an epicyclic reduction principle whereby the highest input/output speed ratio is achieved as the radii of the mating elements approach similarity. This reduction principle is combined with a transverse axis configuration which greatly reduces the overall size and weight of the transmission.

More specifically, it is an object of the present invention to provide a transmission of the type set forth above, in which all the traction elements operate at virtually the same relatively high surface speed, whereby the minimum relative tangential force; transmitted through the engagement areas, will generate the maximum torque through the transmission.

Another object of the present invention is to improve the geometry of the mating traction elements, thereby improving the shape of the engagement areas. This greatly increases the overall efficiency of the present invention.

The foregoing objects, and other objects and advantages which will become apparent, are achieved by providing concentric main and rotor shafts which rotate about the first axis of rotation. The main shaft having a means, such as a spider, for rotatably supporting at least one compound-planet.

Each combined-planet incorporates two traction surfaces. A toroidal shaped traction surface and an inwardly facing conical shaped traction surface. The combined-planet's toroidal traction surface engages an inwardly facing conical shaped traction surface of a reaction member. The reaction member has means for restraining rotary motion. The inwardly facing conical shaped traction surface of the combined-planet engages a toroidal shaped traction surface of a rotor. The rotor is rotatable with the rotor shaft. Axially displacing the spider of the present invention simultaneously changes the traction contact path radii of both the reaction member and the inwardly facing conical shaped traction surface of the compound-planet, thereby varying the input/output speed ratio of the transmission.

An advantage of the foregoing construction is that the geometric shape of the engagement area, which is formed by the mating traction elements, can be very narrow and long. The major axis of the engagement area is parallel to the rolling direction and thus, the direction of the engagement area's tangential force. This engagement area shape greatly increases the coefficient of traction in the rolling direction. At the same time, this engagement area shape virtually eliminates spin related fluid shear. This combination not only increases the capacity of the present invention, but also greatly increases its efficiency.

BRIEF DESCRIPTION OF DRAWINGS

The foregoing features will be more fully understood after consideration of the following detailed description taken in conjunction with the accompanying drawings, in which:

FIG. 1 is a cross-sectional view through a transverse axis infinitely variable transmission, embodying the features of the present invention.

FIG. 2 is a partial cross-sectional schematic of the traction elements, showing the relative position of the elements at an input/output speed ratio of infinity.

FIG. 3 is a schematic of a fixed-ratio conventional planetary drive train which is kinematically similar to the drive shown in FIG. 2.

FIG. 4 is a partial cross-sectional schematic of the traction elements, showing the relative position of the elements at a lower input/output speed ratio.

FIG. 5 is a schematic of a fixed-ratio conventional planetary drive train which is kinematically similar to the drive shown in FIG. 4.

FIG. 6 is a partial cross-sectional schematic of the traction elements, showing the relative position of the elements, with output shaft rotation in opposite direction to that shown in FIG. 4.

FIG. 7 is a schematic of a fixed-ratio conventional planetary drive train which is kinematically similar to the drive shown in FIG. 6.

DETAILED DESCRIPTION

Figure 8:
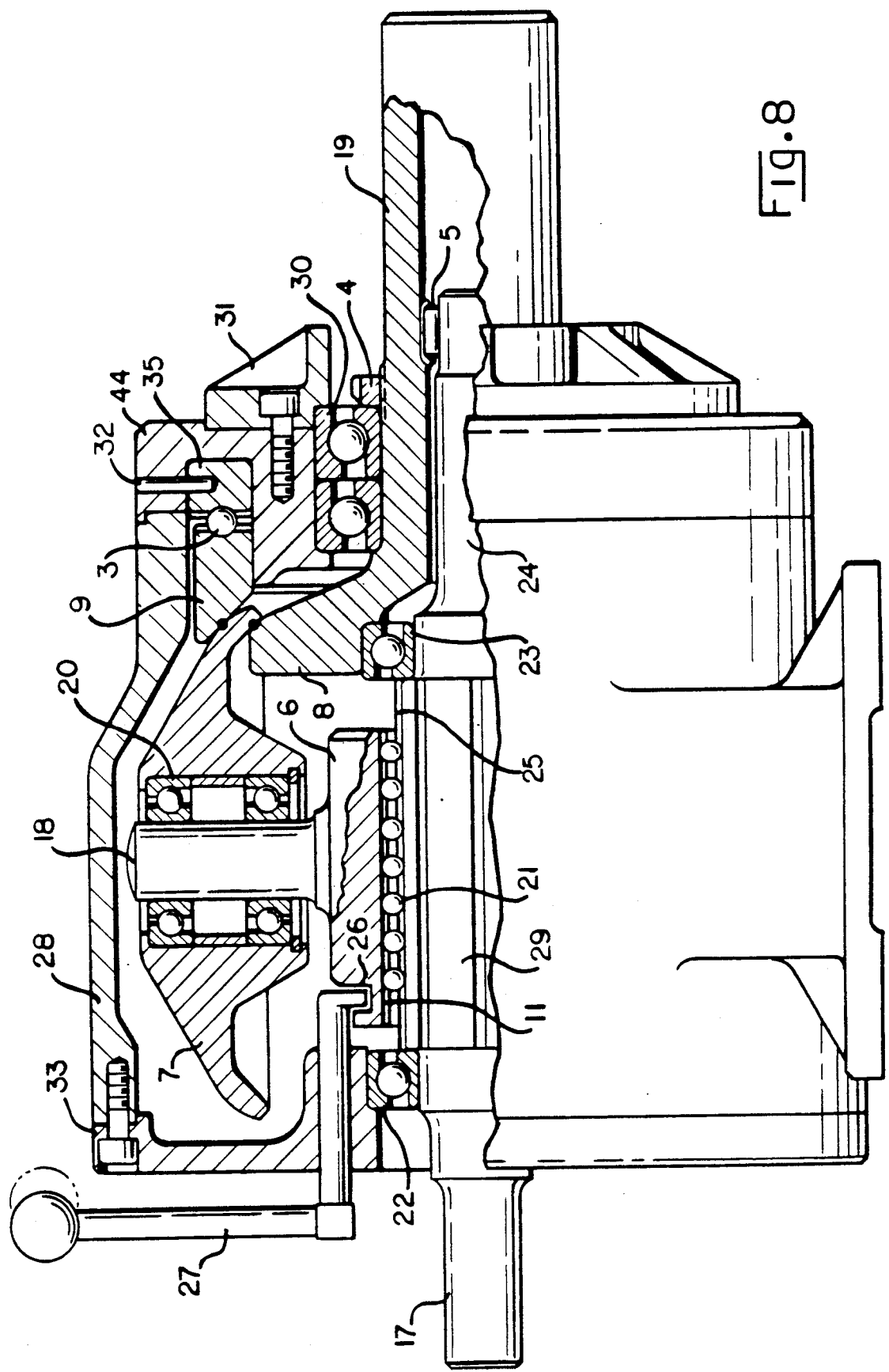
FIG. 8 is a cross-sectional view through the present invention, showing various embodiments.

Referring first to FIG. 1, the embodiment shown comprises a main shaft 17 which rotates about the first axis of rotation 10. The main shaft is rotatably and slidably supported by bearings 22 and 23. A spider 6 arranged to rotate with the main shaft, about the first axis of rotation. The spider includes at least one spindle 18 radiating outwardly. Each spindle slidably supports a bearing 20 which in turn, rotatably supports a compound-planet 7. Each compound-planet has two traction surfaces. The first traction surface 13 has a substantially toroidal shape and the second traction surface 15 has an inwardly facing substantially conical shape. The apex of the compound-planet's conical traction surface is located outwardly on the spindle axis 34. The compound-planet's first traction surface (toroidal) 13 is engaged with an inwardly facing substantially conical shaped traction surface 14 of a reaction member 9. The reaction member is supported coaxially with the first axis of rotation and is restrained from rotation. The apex of the reaction member's conical traction surface is located on the first axis of rotation. The compound-planet's second traction surface (conical) 15 is engaged with a substantially toroidal shaped traction surface 16 of a rotor 8. The rotor rotates with a rotor shaft 19 about the first axis of rotation. The rotor shaft is rotatably supported by a bearing 30.

It should be noted that, the engagement areas on the first traction surface and the second traction surface of the compound-planet are located on the same side of the axis of the compound-planet.

The change in the relationship of the components, when the speed ratio of the present invention is varied, can be seen by comparing the top and bottom halves of FIG. 1. The top configuration represents a high input/output ratio, which for this example, is an input/output ratio of infinity (zero output shaft rotation). The bottom configuration represents a low input/output ratio. It should be noted that, the spatial relationship of the rotor to the reaction member does not change, regardless of the input/output speed ratio.

The geometric shape of each pair of mating elements, which form the engagement areas, are virtually identical. That is, each pair of elements consists of a toroidal traction surface of one element mated to the inwardly facing conical traction surface of a second element, with the axis of rotation of one element substantially perpendicular to the second. As a result of this unique configuration, all the engagement areas employed in the present invention have shapes which are virtually identical. The engagement area shape is a long, narrow oval, with the major axis in the direction of rolling. This geometry greatly increases the coefficient of traction, since traction is directly related to the buildup of lubricant strain in the rolling direction. Additionally, this engagement area shape virtually eliminates spin related fluid shear, thereby greatly increasing efficiency. In a lubricated traction drive, the traction elements do not actually touch. The traction surfaces of the elements are separated by a very thin lubricant film.

It should be noted that in the present invention, almost complete control of the engagement area size and shape is achieved by combining various values of conical angle and toroidal transverse radius. In general, the angle of the conical surface controls the length of the engagement area in the rolling direction, with all other variables held constant. The width of the engagement area is a function of the transverse radius of the toroidal surface. It should be appreciated that for some design configurations, the combination of conical angles, chosen for the traction surfaces of the reaction member and the compound-planet, may require that there be small angular deviations in the perpendicular relationship between the spindle axis and the first axis of rotation.

In operation, assuming an input/output speed ratio of infinity as shown in the top half of FIG. 1, with the input to the main shaft 17 and the output from the rotor shaft 19. The toroidal surface of the compound planet 7 is driven around the conical shaped traction surface of the non-rotating reaction member 9 by the spider spindle 18. At the same time, the compound planet's conical traction surface is rotating about the toroidal traction surface of the rotor 8. Referring now to FIG. 2, engagement area 1 (between the compound planet and the reaction member) and engagement area 2 (between the compound planet and the rotor) both lie on line 12 which extends at an angle of 45° from the point of intersection of the first axis of rotation 10 and the spindle axis 34. Thus, the traction radius of the reaction member R9, is equal to the traction radius of the compound planet at engagement area 1, $R7_1$, and the traction radius of the rotor R8, is equal to the traction radius of the compound planet at engagement area 2, $R7_2$.

A better understanding of the epicyclic reduction principle used in the present invention can be had by referring now to FIG. 3, a schematic of a fixed-ratio conventional planetary drive train which is kinematically similar to the drive shown in the top half of FIG. 1 and in FIG. 2. However, the axes of rotation of all the components, in FIG. 3, are parallel, whereas the axes of rotation of the compound-planets, in FIGS. 1 and 2, are transverse.

Assume that the radius of the compound-planet 7 at engagement area 1, is equal to the radius of reaction member 9 and also assume that the radius of the compound-planet 7 at engagement area 2, is equal to the radius of rotor 8. As the main shaft 17 is rotated, the spider spindles 18 drive the compound-planets 7 around the fixed reaction member 9. Because of the equal radii, the compound-planet 7 simply rolls around the rotor 8, producing zero rotation of the rotor shaft 19. This would be an input/output speed ratio of infinity.

A change in the input/output ratio of the present invention is effected by displacing the spider in an axial direction. Referring now to FIG. 4, the spindle axis 34 is shown moved to a new location 34'.

This movement of the spider also results in a radial movement of the compound-planet. The compound-planet's radial movement is a function of the angles of conical surfaces 14 and 15, which are essentially parallel. Thus, when the spindle axis is moved to new location 34', the compound-planet moves outwardly to the new position shown in FIG. 4. This combined movement of the spider and the compound-planet results in an increase of the effective traction path radius of the compound-planet at engagement area 2, $R7_2$, and also, an increase of the traction path radius of the reaction member R9. However, there is no change in the traction radii of the rotor R8, or the compound-planet at engagement area 1, $R7_1$.

Referring now to FIG. 5, elements $7_1$ and 8 have the same radii as before. The radii of $7_2$ and 9 have been increased. As the main shaft 17 is rotated, the spider spindles 18 drive the compound planets 7 around the fixed reaction member 9. Since element $7_1$ is smaller than the fixed reaction member 9, element $7_1$ would make more than one revolution for each revolution of the main shaft. In addition, since element $7_2$ is larger than the rotor 8, the rotor would make more than one revolution for each revolution of element $7_2$. Since this configuration produces a substantial rotation of the rotor shaft 19, the result is a lower input/output speed ratio than that shown in FIG. 2 and FIG. 3. It should be observed that by utilizing various combinations of radii for the traction elements, an input/output ratio of infinity (zero output shaft rotation) can be located anywhere along the ratio range.

Referring now to FIG. 6, spindle axis 34 is now moved to location 34''. This results in a decrease in the traction radii of $R7_2$ and R9. There is no change in the traction radii of R8 and $R7_1$.

Referring now to FIG. 7, assume that elements $7_1$ and 8 have the same radii as before. The radii of $7_2$ and 9 have been decreased. As the main shaft 17 is rotated, the spider spindles 18 drive the compound planets 7 around the fixed reaction member 9. Since element $7_1$ is larger than fixed reaction member 9, element $7_1$ would make less than one revolution for each revolution of the main shaft. In addition, since element $7_2$ is smaller than rotor 8, the rotor would make less than one revolution for each revolution of element $7_2$. The rotor shaft 19 rotation is now in the opposite direction than that shown in FIG. 5.

It should be noted from above that, the present invention does not depend on large differences in radii of the mating elements to obtain the required input/output speed ratio. Instead, the present invention uses an epicyclic reduction principle whereby the highest input/output speed ratio is achieved as the radii of the mating elements approach similarity. Therefore, the surface velocity at the engagement area does not change appreciably, regardless of the input/output speed ratio. For example, FIGS. 2 and 3 show high surface velocities at an input/output ratio of infinity (zero output shaft speed). Since power is the product of torque and speed, it is evident that at an input/output speed ratio of infinity, the output torque is theoretically infinite, neglecting the system losses. Thus, unlike conventional traction drives, the tangential force requirement of the engagement areas of the present invention does not increase as the input/output ratio increases, assuming a constant input torque. Consequently, at the higher input/output speed ratios, the load normal to the engagement area is only a small fraction of that required for a conventional traction drive. It must be appreciated therefore, that while conventional drive trains must incorporate means such as the commonly used ball and ramp loading mechanism, to prevent slip of the engagement areas at high output torque loads, this would not be necessary for the majority of applications of the present invention. A means, such as a spring, could be used to provide both the engagement area preload, and to maintain the normal force on the engagement area as well. It must be appreciated that, depending on the use of the present invention, the means for maintaining a force normal to the engagement area could be located at several locations. For example, between the reaction member and the housing, or between the output rotor and the output shaft, or between engagement area 1 and engagement area 2 of the compound-planet.

It should be noted that, rotating the axes of the compound planets perpendicular to the first axis of rotation of the drive, permits the inclusion of traction element radii not possible with parallel axes of rotation. In addition, a comparison of FIG. 1 to FIG. 3, demonstrates how rotating the axes of the compound-planets perpendicular to the first axis of rotation of the drive, greatly reduces the overall size and weight of the present invention.

The input/output speed ratio is controlled by means for establishing the spatial relationship of the rotor, the reaction member, and the compound-planet. That is, by controlling the spatial relationship of the spider to the reaction member and rotor. This is accomplished by either controlling the axial position of the spider relative to the reaction member and rotor, while allowing the compound-planet freedom to move; or controlling the axial position of the reaction member and rotor, relative to the spider, while allowing the compound-planet freedom to move. Another method is, to control the axial position of the compound-planet, relative to the spindle axis, while allowing the spider freedom to move.

FIG. 8, is a cross-sectional view showing various embodiments of the present invention. A housing, indicated generally at 28, includes an end plate 33, containing a bearing 22, which rotatably supports a main shaft 17. The main shaft rotates about the first axis of rotation. Housing 28 also includes a support frame 44, containing bearings 30, which rotatably support a rotor shaft 19 which rotates about the first axis of rotation. The bearings are held in position in the support frame by a bearing retainer 31, and are secured on the rotor shaft by a locknut 4. A spider 6 is arranged to rotate with the main shaft, about the first axis of rotation. The spider has a plurality of spindles 18 radiating outwardly at spaced intervals around the circumference of a hub portion of the spider. Three spindles are used in the preferred embodiment but less than or more than three could be used. The plane of rotation of the spindles is substantially perpendicular to the first axis of rotation. Each spindle slidably supports bearings 20 which rotatably support a combined-planet 7. The combined-planet has two traction surfaces, a toroidal shaped traction surface and a conical shaped traction surface. The combined-planet's toroidal traction surface is engaged with the conical shaped traction surface of a reaction member 9. The combined-planet's conical shaped traction surface is engaged with the toroidal traction surface of a rotor 8. The rotor is included as part of rotor shaft 19. Alignment of the main shaft and the rotor shaft about the first axis of rotation is maintained by bearing 23 and bearing 5 on a main shaft extension 24. In this embodiment, a main shaft central portion 29, has axial ball grooves 25, at spaced intervals around its circumference. The spider 6 contains cooperating axial ball grooves 11. Balls 21 permit the spider to move freely in an axial direction on the central portion, but insure that the main shaft and the spider rotate as a unit.

In this embodiment, the force normal to the engagement areas is maintained by means such as a commonly used ramp loading mechanism, which includes complementary opposing sloping surfaces formed in the slidably mounted reaction member 9 and in a fixed cam portion 35. The fixed cam portion is prevented from rotating by means such as a pin 32. Loading balls 3, which are spaced apart from each other by means such as a ball cage (not shown), transmit torque between the traction ring and the fixed cam portion and thus, generate an axial force. It must be appreciated that the angle and shape of the inclined sloping surfaces depend upon the design use of the present invention whereby the force normal to the engagement areas, can be proportioned to the required tangential force. Similarly, rollers may be utilized instead of balls.

Figure 10:
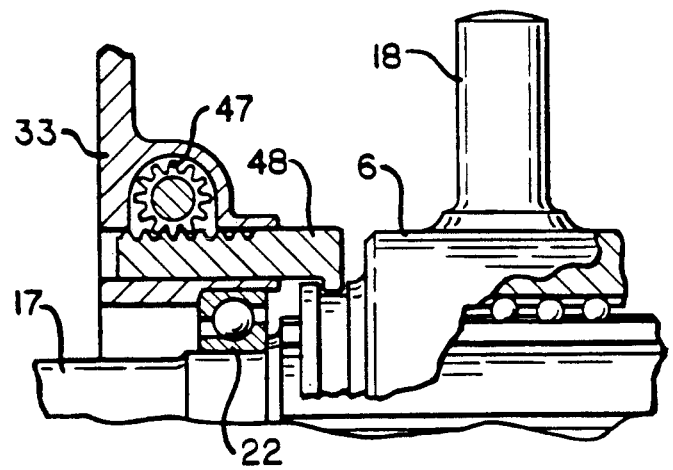
FIG. 10 is a partial cross-sectional view through the present invention, showing an alternate means for positioning the spider.

A change in the input/output ratio is effected by displacing the spider in an axial direction, This is accomplished by a means for positioning the spider axially, relative to the rotor and reaction member, such as control lever 27 and a cooperating radial groove 26 formed in the spider. It must be appreciated that other mechanical, hydraulic or electrical means could be used to position the spider axially, such as that shown in FIG. 10, whereby a gear 47 and gear rack 48 are used to position the spider.

Figure 9:
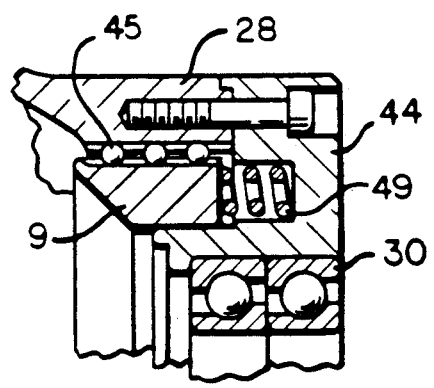
FIG. 9 is a partial cross-sectional view through the present invention, showing compression springs providing both preload, and force normal to the engagement area.

FIG. 9 shows how compression springs 49 are employed as a means for maintaining both the preload force and the force normal to the engagement areas. Means for restraining rotary motion of the reaction member 9 includes at least one axial ball groove in the housing 28, cooperating through balls 45 with at least one axial ball groove in the reaction member.

Figure 11:
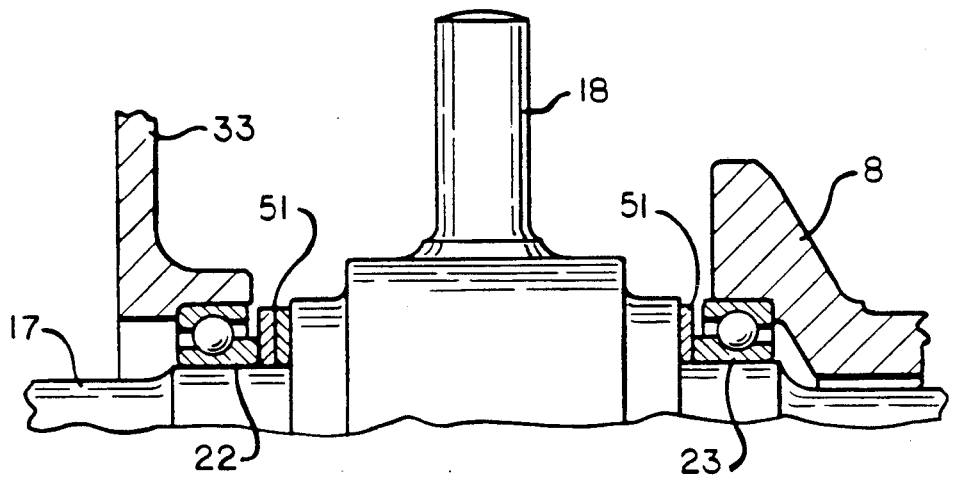
FIG. 11 is a partial cross-sectional view through the present invention, showing another alternate means for positioning the spider.

FIG. 11 shows an alternate means for positioning the spider axially. Means such as spacers 51, are employed for positioning the main shaft and spider in a predetermined axial location, relative to the reaction member and the rotor, for those applications which require maintaining a specific input/output ratio for a extended period of time.

Figure 12:
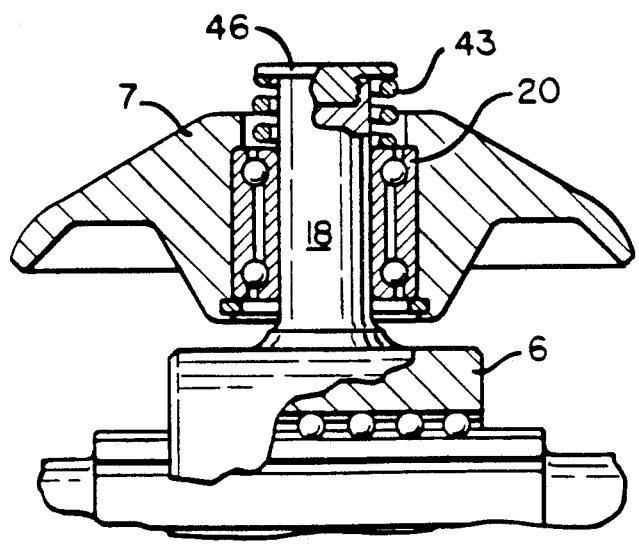
FIG. 12 is a cross-sectional view through the present invention, showing a speed control means.

FIG. 12 shows a speed control means. In this embodiment, the centrifugal force generated by the compound-planets is used as speed governing means. As rotational velocity increases, centrifugal force moves the compound-planets 7 outwardly on the spindles 18 thereby decreasing the input/output ratio. This in turn, increases the input torque. The centrifugal force is opposed by a biasing means, such as a spring 43 and a retaining flange 46. It should be understood that this automatic system could be used in conjunction With another control means.

Figure 13:
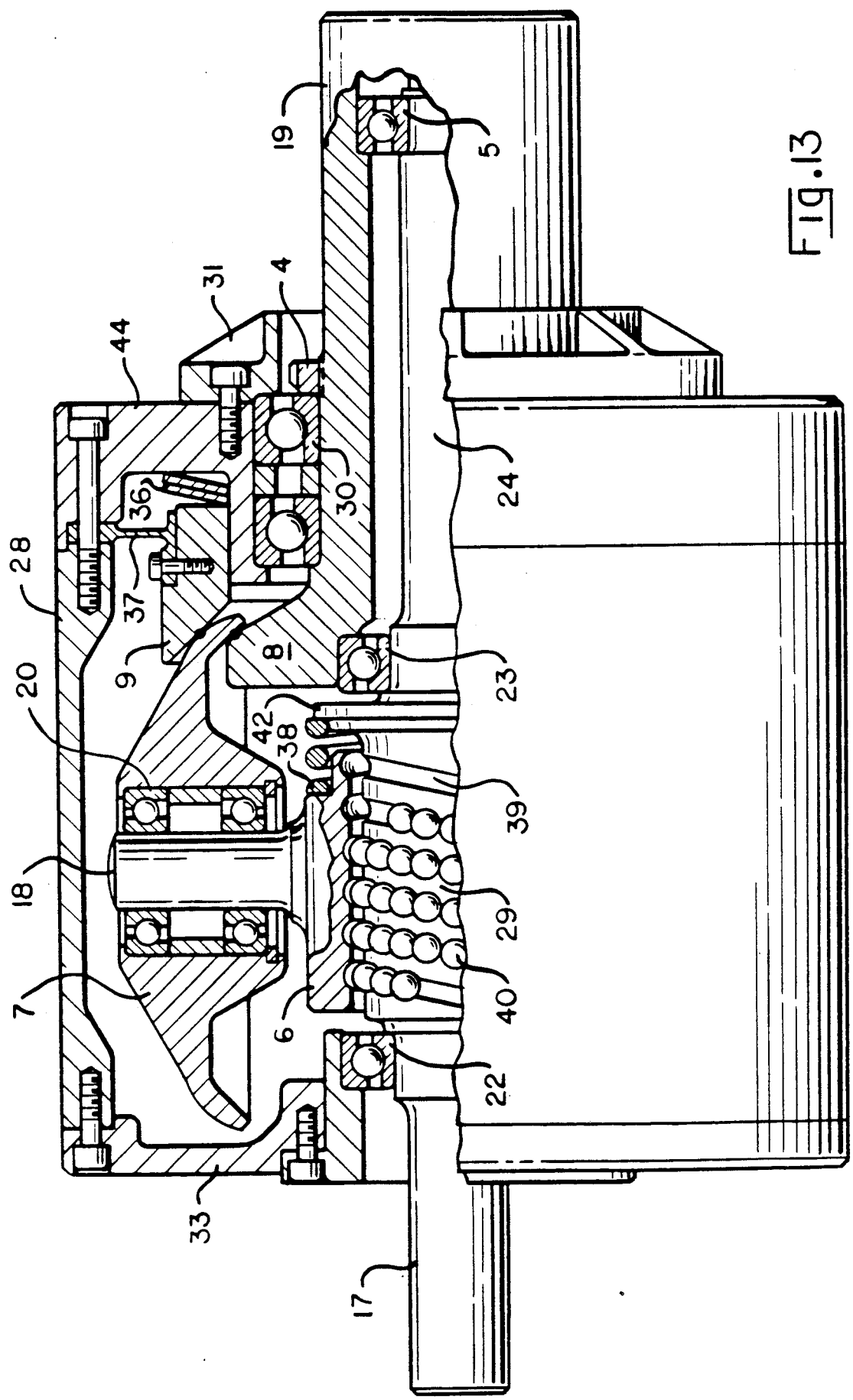
FIG. 13 is a cross-sectional view through the present invention, showing other embodiments.

FIG. 13 is a cross-sectional view showing other embodiments of the present invention. In this configuration, means, such as at least one bevel spring washer 36, can be used for maintaining a preload force and a force normal to the engagement areas, since the tangential force on the engagement areas does not vary appreciably, with a change in the input/output ratio. The reaction member 9 is restrained from rotating by means such as a diaphragm 37, which does allow axial movement. The inside diameter of the diaphragm is mounted on the reaction member and the outside diameter is fixed to the housing 28. It must be appreciated that other means, such as splines or axial ball grooves, could be used for this purpose The embodiment shows a means for positioning the spider angularly, relative to the main shaft, and axially, relative to the rotor and reaction member, by using a ball-screw and ball-nut. The ball-screw, 39 formed in the central portion 29 of the main shaft 17, cooperates through balls 40, with the ball-nut formed in the spider hub 6. The resistance of the output torque load on rotor shaft 19 causes the ball-screw to reposition itself within the ball-nut, which in turn, results in the movement of the ball-nut and spider assembly axially, to a new position. The spider continues to rotate with the main shaft. The axial movement of the spider is opposed by a biasing means, such as a control spring 38 and a radial flange 42. As the spider moves axially, relative to the rotor and reaction member, it increases the input/output speed ratio, which results in a reduction in the internal system torque, until the control spring force is again in balance. Thus, the input/output speed ratio is automatically regulated to maintain a constant system torque, regardless of the output torque. This ball-screw configuration makes it possible to generate the force needed to move the traction elements, by sensing a comparatively small change in input torque to the main shaft. It must be appreciated that the pitch of the ball-screw depends upon the design use of the present invention. Likewise, the ball-screw could be right or left hand. It should be understood that this automatic system could be used in conjunction with another control means.

Figure 16:
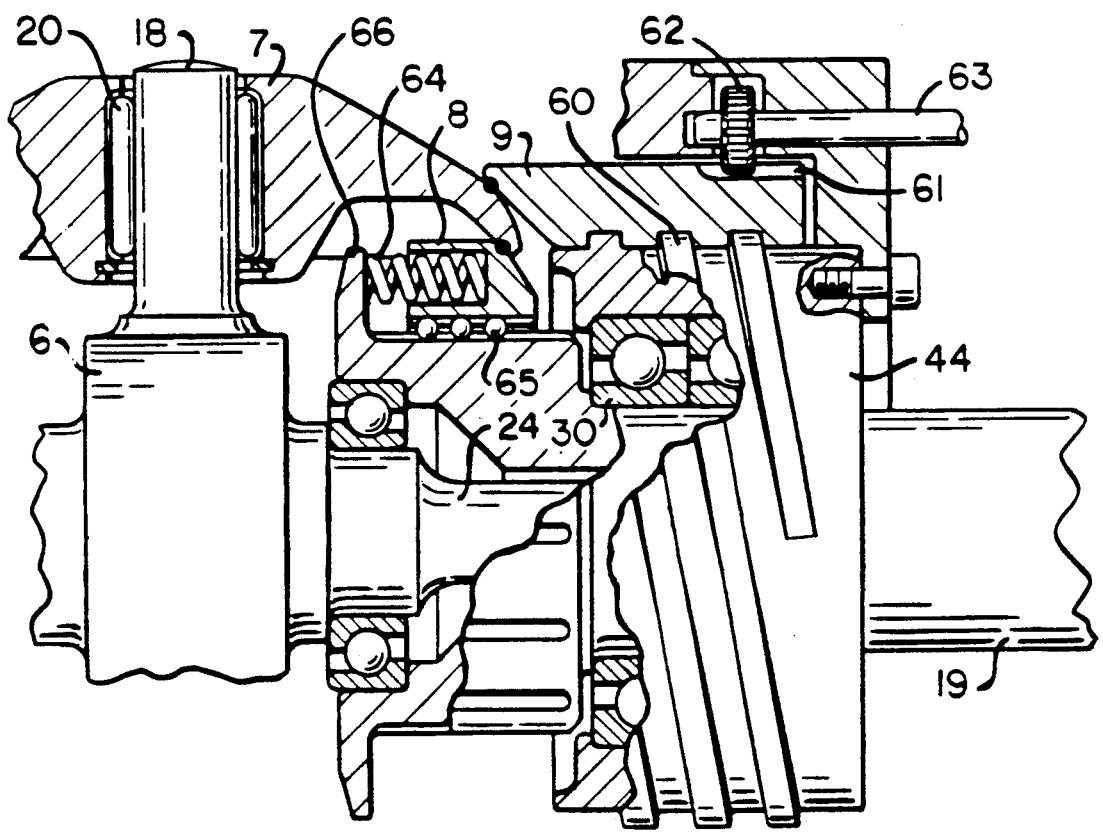
FIG. 16 is a partial cross-sectional view through the present invention, showing a means of positioning the reaction member and rotor.

FIG. 16 is a partial cross-sectional top view through another embodiment of the present invention, showing a means for changing the axial position of the reaction member and rotor, relative to the spider and thus, controlling the input/output ratio. The support frame 44 incorporates screwing means, such as acme threads 60. The reaction member 9 has cooperating screwing means, such as threads, on the inner circumference. The reaction member also includes gear teeth 61 around the outer circumference. A control shaft 63 incorporates a spur gear 62, which engages the reaction member teeth, thus restraining rotary motion of the reaction member. Axially positioning the reaction member is accomplished by rotating the control shaft and spur gear during operation of the present invention, thus causing the reaction member to advance on the acme threads. The rotor 8 has means, such as axial ball grooves in the rotor cooperating through balls 65 with ball grooves on the rotor shaft 19, for allowing axial movement but preventing rotary movement with the rotor shaft. The rotor has means for maintaining its spatial relationship with the reaction member and at the same time, maintaining a force normal to the traction contact areas, such as compression springs 64 and radial flange 66.

While the above descriptions contain many specificities, these should not be construed as limitations on the scope of the invention, but rather, as an exemplification of a few embodiments thereof. Many other combinations and variations are possible. For example:

The usual configuration of the present invention which would be used for most applications, such as vehicle transmissions, would have shafts on opposing ends of the housing. However, many other configurations are possible.

Figure 14:
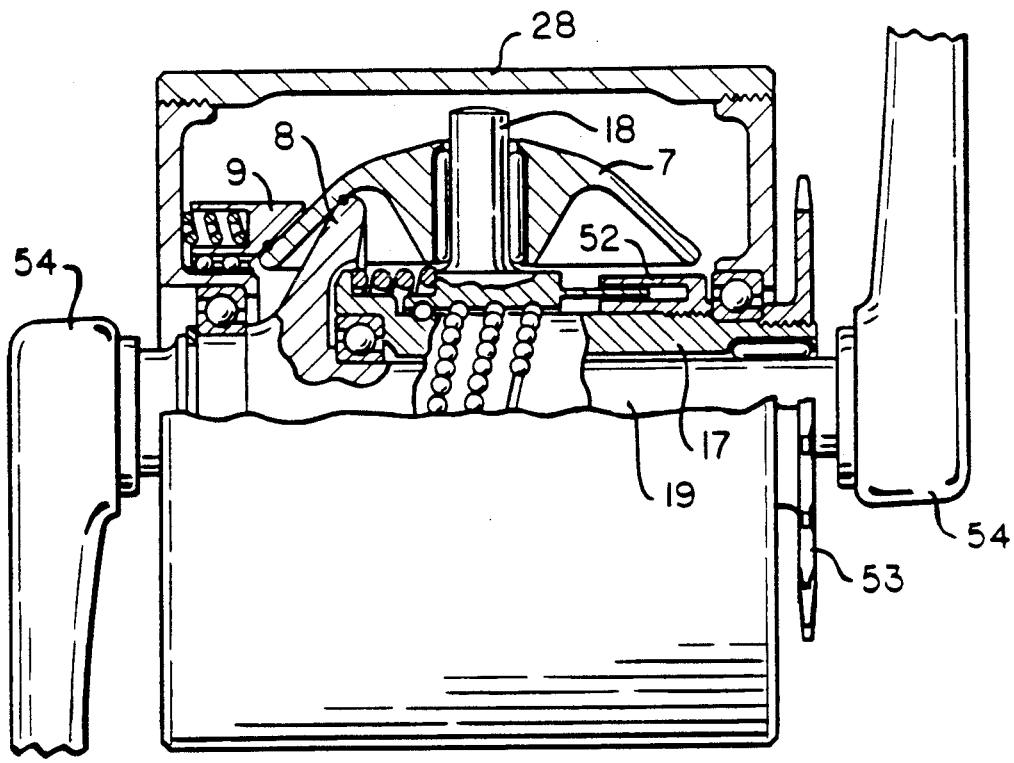
FIG. 14 is a partial cross-sectional view through the present invention, showing the rotor shaft extending through both sides of housing.

FIG. 14 is a partial cross-sectional top view through another embodiment of the present invention, showing the rotor shaft 19 journal(R)d for rotation within the main shaft 17, and extending through both sides of housing. This embodiment could be used in applications such as an infinitely variable bicycle transmission. The input, from pedal cranks 54, is to the rotor shaft 19. The output is from main shaft 17, to output means such as chain sprocket 53. The automatic control means is similar to that shown in FIG. 13. Means, such as a viscous damper located generally at 52, is employed due to the uneven input torque. The viscous damper consists of a nested plurality of cylinders. Alternating cylinders are mounted to the spider hub and the main shaft, with oil acting as the damping means. Another location on a bicycle, for this embodiment, would be at the rear wheel. For that application, the rotor shaft 19 would serve as the wheel axle and is fixed to the frame in the usual manner. The input would be by means such as chain sprocket 53, which is mounted on main shaft 17. The output would be from housing 28, which would serve as the wheel hub and rotate in the usual manner, about the stationary rotor shaft (wheel axle).

Figure 15:
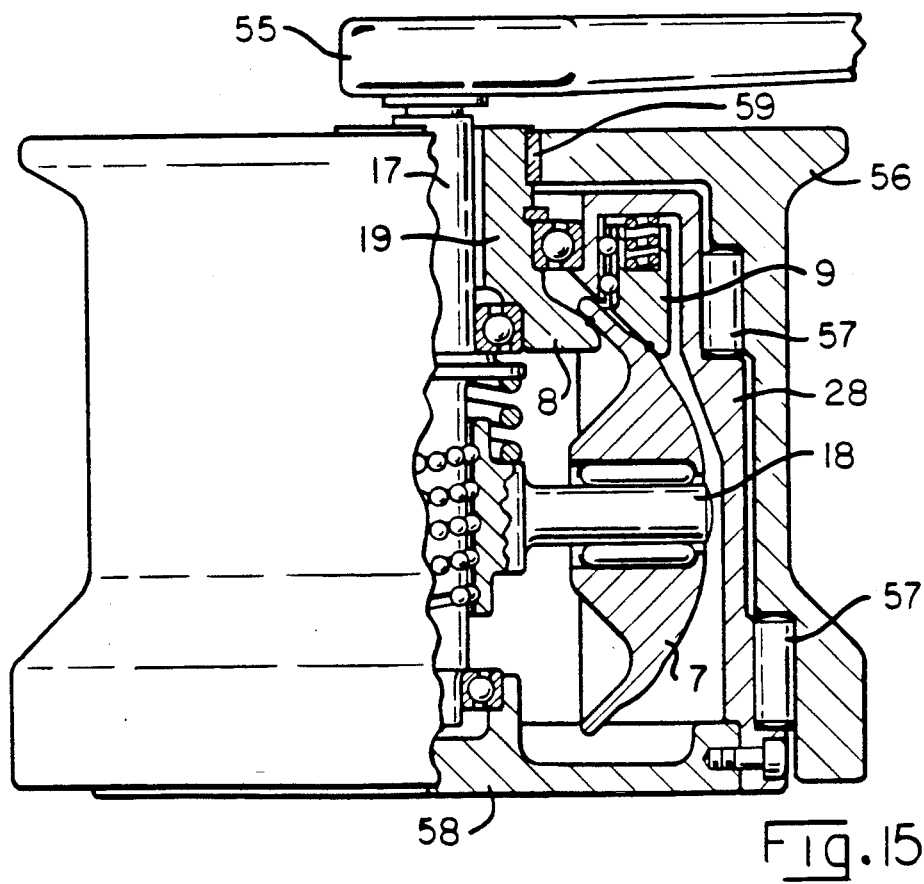
FIG. 15 is a partial cross-sectional view through the present invention, showing the main shaft and rotor shaft on the same side of the housing.

FIG. 15 is a partial cross-sectional view through another embodiment of the present invention, showing the main shaft 17 journaled for rotation within rotor shaft 19 with both shafts extending through the same side of the housing. This configuration is for an infinitely variable boat deck winch. The input, from a winch handle 55, is to the main shaft 17. The output is from the rotor shaft 19, to a drum 56 which is rotatably secured to the rotor shaft by means such as, splines or key 59. The drum is rotatably supported by the housing 28, through bearings 57. The automatic control means is similar to that shown in FIG. 13. The winch is fixed to the deck through housing base 58.

This winch could be designed with the rotor shaft fixed to the deck and the housing 28 combined with the rotating drum 56.

What is claimed as new and desired to be secured by Letters Patent is:

1. A transverse axis transmission comprising:
   a main shape having means for rotatably supporting at least one compound-planet;
   said compound-plant having a first surface and a second surface for conveying rotational energy;
   said compound-plant's first surface for conveying rotational energy engaging a reaction member's surface for conveying rotational energy, whereby said compound-planet rotates about its own axis and simultaneously rotates around said reaction member;
   said reaction member having means for restraining rotary motion;
   said compound-planet's second surface for conveying rotational energy engaging a rotor's surface for conveying rotational energy, whereby said compound-planet rotates about its own axis and simultaneously rotates around said rotor;
   the engagement areas of the first and second surface for conveying rotational energy located on the same side of the axis of said compound-planet;
   a rotor shaft rotatable with said rotor.

2. The transverse axis transmission, set forth in claim 1, further comprising means for maintaining a force normal to the engagement areas.

3. The transverse axis transmission set forth in claim 2, wherein said main shaft and said rotor shaft rotate coaxially about a first axis of rotation.

4. The transverse axis transmission set forth in claim 3, further comprising means for establishing the spatial relationship of said rotor, said reaction member, and said compound-planet.

5. The transverse axis transmission set forth in claim 4, wherein said means for rotatably supporting at least one said compound-planet includes a spider having at least one spindle radiating outwardly.

6. The transverse axis transmission set forth in claim 4, wherein the engagement areas are formed by an inwardly facing, substantially conical shaped surface for conveying rotational energy, mated to a substantially toroidal shape surface for conveying rotational energy.

7. A transverse axis transmission comprising:
   a main shaft rotating about a first axis of rotation;
   a spider arranged to rotate with said main shaft about the first axis of rotation, having at least one spindle radiating outwardly;
   a compound-planet having a first surface and a second surface for conveying rotational energy, rotating about each said spindle;
   said compound-planet's first surface for conveying rotational energy, engaging a reaction member's surface for conveying rotational energy, whereby said compound-planet rotates about its own axis and simultaneously rotates around said reaction member;
   said reaction member having means for restraining rotary motion;
   said compound-planet's second surface for conveying rotational energy, engaging a rotor's surface for conveying rotational energy, whereby said compound-planet rotates about its own axis and simultaneously rotates around said rotor;
   the engagement areas of the first and second surface for conveying rotational energy located on the same side of the axis of said compound-planet;
   a means for maintaining a force normal to the engagement areas;

means for establishing the spatial relationship of said rotor, said reaction member, and said compound-planet;

a rotor shaft rotatable with said rotor and rotating coaxially with said main shaft.

8. The transverse axis transmission set forth in claim 7, wherein said surfaces for conveying rotational energy include traction surfaces.

9. The transverse axis transmission set forth in claim 8, wherein said main shaft is journaled !or rotation within said rotor shaft.

10. The transverse axis transmission set forth in claim 8, wherein said rotor shaft is journaled for rotation within said main shaft.

11. The transverse axis transmission set forth in claim 8, wherein said means for maintaining a force normal to the engagement areas includes at least one spring.

12. The transverse axis transmission set forth in claim 8, wherein said compound-planet's first surface for conveying rotational energy has a substantially toroidal shape.

13. The transverse axis transmission set forth in claim 8, wherein said compound-planet's second surface for conveying rotational energy has an inwardly facing, substantially conical shape.

14. The transverse axis transmission set forth in claim 8, wherein said reaction member's surface for conveying rotational energy has an inwardly facing substantially conical shape.

15. The transverse axis transmission set forth in claim 8, wherein said rotor's surface for conveying rotational energy has a substantially toroidal shape.

16. A transverse axis transmission comprising:

a housing;

a main shaft rotating about a first axis of rotation;

a rotor shaft coaxial with said main shaft and rotating about the first axis of rotation;

a spider arranged to rotate with said main shaft about the first axis of rotation having at least one spindle radiating outwardly;

each said spindle rotatably and slidably supporting a compound-planet having a first traction surface and a second traction surface;

a reaction member coaxial with the first axis of rotation having a traction surface;

means for restraining rotary motion of said reaction member relative to said housing;

a rotor having a traction surface rotatable with said rotor shaft;

said compound-planet's first traction surface engaging said member's traction surface, whereby said compound-planet rotates about its own axis and simultaneously rotates around said reaction member;

said compound-planet's second traction surface engaging said rotor's traction surface, whereby said compound-planet rotates about its own axis and simultaneously rotates around said rotor;

the engagement areas of the first and second traction surface located on the same side of the axis of said compound-planet;

means for maintaining a force normal to the engagement areas.

17. The transverse axis transmission set forth in claim 16, wherein said means for restraining rotary motion includes at least one axial ball groove in said housing, cooperating through balls, with at least one axial ball groove in said reaction member.

18. The transverse axis transmission set forth in claim 16, wherein said means for maintaining a force normal to the engagement areas includes at least one spring.

19. The transverse axis transmission set forth in claim 16, further comprising means for positioning said spider axially, relative to said rotor and said reaction member.

20. The transverse axis transmission set forth in claim 16, further comprising means for positioning said rotor and said reaction member axially, relative to said spider.

21. The transverse axis transmission set forth in claim 16, further comprising means for displacing said spider angularly, relative to said main shaft and axially, relative to said rotor and said reaction member.

22. The transverse axis transmission set forth in claim 21, wherein said means for positioning said spider axially and angularly is further defined as a ball-screw rotating with said main shaft, cooperating through balls with a ball-nut rotating with said spider, whereby the angular relationship between said main shaft and said spider determines the axial position of said spider.

23. The transverse axis transmission set forth in claim 16, further comprising means for damping torque, such as a viscous damper between said spider and said main shaft 24. The transverse axis transmission set forth in claim 16, wherein said main shaft is journaled for rotation within said rotor shaft.

25. The transverse axis transmission set forth in claim 16, wherein said rotor shaft is journaled for rotation within said main shaft.

26. The transverse axis transmission set forth in claim 16, wherein said compound-planet is axially movable with respect to said spindle.

27. The transverse axis transmission set forth in claim 26, wherein the axial movement of said compound-planet is opposed by a biasing means such as a spring.

28. The transverse axis transmission set forth in claim 16, wherein said compound-planet's first traction surface has a substantially toroidal shape.

29. The transverse axis transmission set forth in claim 16, wherein said compound-planet's second traction surface has a inwardly facing, substantially conical shape, with the conical apex located outwardly on the spindle axis.

30. The transverse axis transmission set forth in claim 16, wherein said reaction member's traction surface has a inwardly facing, substantially conical shape, with the conical apex located on the first axis of rotation.

31. The transverse axis transmission set forth in claim 16, wherein said rotor's traction surface has a substantially toroidal shape.

* * * * *

UNITED STATES PATENT AND TRADEMARK OFFICE
CERTIFICATE OF CORRECTION

PATENT NO.   :   5,051,106

DATED        :   Sept. 24, 1991

INVENTOR(S)  :   Joseph E. Fritsch

It is certified that error appears in the above-identified patent and that said Letters Patent is hereby corrected as shown below:

Column 10, line 1, change "shape" to --shaft--.

Column 11, line 54, change "said member's" to --said reaction member's--.

Signed and Sealed this

Fifth Day of January, 1993

Attest:

DOUGLAS B. COMER

Attesting Officer

Acting Commissioner of Patents and Trademarks